United States Patent
Mylläri et al.

(10) Patent No.: US 12,550,893 B2
(45) Date of Patent: Feb. 17, 2026

(54) AGRICULTURAL FILM AND USE

(71) Applicant: Premix Oy, Rajamäki (FI)

(72) Inventors: Ville Mylläri, Tampere (FI); Kari Alha, Kerava (FI)

(73) Assignee: Premix Oy, Rajamäki (FI)

( * ) Notice: Subject to any disclaimer, the term of this patent is extended or adjusted under 35 U.S.C. 154(b) by 920 days.

(21) Appl. No.: 17/596,507

(22) PCT Filed: Jun. 12, 2020

(86) PCT No.: PCT/FI2020/050414
§ 371 (c)(1),
(2) Date: Dec. 11, 2021

(87) PCT Pub. No.: WO2020/249868
PCT Pub. Date: Dec. 17, 2020

(65) Prior Publication Data
US 2022/0295787 A1    Sep. 22, 2022

(30) Foreign Application Priority Data
Jun. 13, 2019   (FI) .................................... 20195509

(51) Int. Cl.
*A01N 25/10*   (2006.01)
*A01N 65/06*   (2009.01)

(52) U.S. Cl.
CPC ............. *A01N 25/10* (2013.01); *A01N 65/06* (2013.01)

(58) Field of Classification Search
None
See application file for complete search history.

(56) References Cited

U.S. PATENT DOCUMENTS

| | | |
|---|---|---|
| 3,598,776 A | 8/1971 | Schirmer |
| 5,473,000 A | 12/1995 | Pinomaa |
| 2002/0134012 A1* | 9/2002 | Ding ................ A01C 1/06 47/57.6 |
| 2013/0045954 A1 | 2/2013 | De Leij et al. |
| 2019/0271111 A1* | 9/2019 | Holopainen ......... D06M 15/70 |
| 2020/0196613 A1* | 6/2020 | Alha .................. A01N 65/06 |

FOREIGN PATENT DOCUMENTS

| | | |
|---|---|---|
| CN | 104479199 A | 4/2015 |
| CN | 105482386 A | 4/2016 |
| CN | 106982681 A | 7/2017 |
| CN | 109863191 A | 6/2019 |
| GB | 1061366 A | 3/1967 |
| GB | 2473460 A | 3/2011 |
| JP | H06242598 A | 9/1994 |
| JP | 2001234066 A | 8/2001 |
| WO | WO-2007120147 A1 | 10/2007 |
| WO | WO-2008067578 A1 | 6/2008 |
| WO | WO-2018091783 A1 | 5/2018 |
| WO | WO-2018229190 A1 * | 12/2018 ............. A01N 25/10 |

OTHER PUBLICATIONS

International Preliminary Report on Patentability, issued in PCT/FI2020/050414, dated Mar. 11, 2021; ISA/EP.
International Search Report and Written Opinion of the International Searching Authority, issued in PCT/FI2020/050414, mailed Aug. 20, 2020; ISA/EP.
European Office Action for Application No. 20740667.9 dated Jul. 10, 2024.

* cited by examiner

*Primary Examiner* — David J Blanchard
*Assistant Examiner* — Daniel F Coughlin

(57) ABSTRACT

A polymer film, comprising at least one active layer made of a composition containing a polymeric substrate comprising at least one of the polyolefin polymer and polyamide 6, and a coniferous resin acid(s) dispersed in the polymeric substrate.

14 Claims, No Drawings

AGRICULTURAL FILM AND USE

CROSS-REFERENCE TO RELATED APPLICATIONS

This application is a 371 U.S. National Phase of International Application No. PCT/FI2020/050414 filed Jun. 12, 2020, which claims priority to Finnish patent application Ser. No. 20195509, filed Jun. 13, 2019. The entire disclosures of the above applications are incorporated herein by reference.

BACKGROUND

The invention relates to an agricultural film comprising coniferous resin acid(s) dispersed in the polymeric substrate.

The invention further relates to a use of the agricultural film.

The demand for materials inhibiting or delaying spoilage of agricultural products is constantly growing.

BRIEF DESCRIPTION

Viewed from a first aspect, there can be provided an agricultural film, comprising
at least one active layer made of a composition containing:
 a polymeric substrate comprising polyolefin polymer, and
 a coniferous resin acid(s) dispersed in the polymeric substrate, and
 one or more further polymer(s) for controlling release rate of the coniferous resin acid(s), the further polymer(s) selected from:
 polyamide, such as PA6,
 inherently dissipative polymer (IDP), such as polyethylene-polyether-copolymer,
 polyethylene-block-amide (PEBA),
 polyether-polyamide block copolymer, wherein
 the amount of the further polymer is 1%-90%, preferably 5%-40%, more preferably 10%-30%, and
 wherein the active layer constitutes at least one skin of the polymer film.

An advantage is that an agricultural film inhibiting or delaying spoilage of agricultural products may be achieved.

Viewed from a further aspect, there can be provided a use of agricultural film as defined above for covering silage.

An advantage is that an agricultural film inhibiting or delaying spoilage of silage may be achieved.

Viewed from a further aspect, there can be provided a use of agricultural film as defined above for covering growing plant(s).

An advantage is that a usage for inhibiting or delaying spoilage of growing plant(s) may be achieved.

The agricultural film and the use are characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas.

Features of the different embodiments of the invention may, within the scope of the basic inventive idea, be applied to other embodiments.

Coniferous resins acids are advantageously available in rosin, such as in spruce resin, and tall oil fraction obtained as a by-product of a kraft pulping process of wood. Rosin primarily includes abietic acid type, e.g. abietic acid, dehydro abietic acid, and pimaric acid type, e.g. pimaric acid, isopimaric acid, resin acids.

Generally, coniferous resin acid(s) are available in a wide variety of sources. Coniferous resin acids are typically of spruce or pine origin. For example, coniferous resin acids are provided as "resin" or "rosin". According to a definition found in the literature, "resin" is a solid or highly viscous substance of plant or synthetic origin. Resin is usually a mixture of organic compounds.

According to a definition, "rosin" is a solid form of resin produced by heating fresh liquid of resin to vaporize the volatile liquid terpene components. Rosin is also called colophony. The terms resin, rosin and colophony are also used synonymously in the literature.

In the present invention, coniferous resin acids can be originated from any source. In an embodiment, the resin acids are provided in a highly viscous form of native resin found on the trunk, stub and branches of coniferous trees. This form of resin acids is called as "resin" in the present invention.

The term "silage" is fermented, high-moisture stored fodder which can be fed to cattle, sheep and other such ruminants (cud-chewing animals) or used as a biofuel feedstock for anaerobic digesters. It is fermented and stored in a process called ensilage, ensiling or silaging, and is usually made from grass crops, including maize, sorghum or other cereals, using the entire green plant (not just the grain). Silage can be made from many field crops, and special terms may be used depending on type: oatlage for oats, haylage for alfalfa, etc.

Silage is made by one or more of the following methods: placing cut green vegetation in a silo or pit; piling the vegetation in a large heap and compressing it down so as to purge as much oxygen as possible, then covering it with a plastic sheet; or by wrapping large round bales tightly in plastic film.

The "growing plant" may be e.g. strawberry, especially garden strawberry, or some another berry, lettuces, cabbages, beets, etc. The film may be used as mulching film, etc.

DETAILED DESCRIPTION

In an embodiment, the polymeric substrate comprises poly-olefin polymer, and the active layer further comprises one or more further polymer(s) for controlling release rate of the coniferous resin acid(s), the further polymer(s) selected from:
 polyamide, such as PA6,
 inherently dissipative polymer (IDP), such as polyethylene-polyether-copolymer,
 polyethylene-block-amide (PEBA),
 polyether-polyamide block copolymer.

The concept "polyolefin polymer" includes polyolefins as such, polyolefin co-polymers, such as ethylene-vinyl-acetate (EVA), ethylene-methyl-acrylate (EMA), ethylene-ethyl-acrylate (EEA), ethylene-butyl-acrylate (EBA), ethylene-acrylic-acid (EAA), ethylene-methacrylic-acid (EMAA), and polyolefins grafted with functional monomers like acrylic acid, maleic acid anhydride or vinyl silane.

In an embodiment, the amount of the further polymer is 1%-90%, preferably 5%-40%, more preferably 10%-30%.

In an embodiment, the active layer comprises a booster material for boosting the effect of the coniferous resin acid(s), the booster material comprising at least one of chemicals listed herein:
sorbates,
benzoates.

In an embodiment, the booster material comprises potassium sorbate.

In an embodiment, the booster material comprises sodium benzoate.

In an embodiment, the amount of the booster material is 0.1%-20%, more preferably 0.2%-5%, even more preferably 0.5%-3%.

In an embodiment, the coniferous resins acid(s) are in rosin, such as in pine resin.

In an embodiment, the coniferous resins acid(s) comprises tall oil rosin, and/or gum rosin, and/or wood rosin.

In an embodiment, the coniferous resins acid(s) comprises an abietic acid type resin acid(s), such as abietic acid, dehydro abietic acid.

In an embodiment, the coniferous resins acid(s) comprises pimaric acid type resin acid(s), such as pimaric acid, isopimaric acid resin acids.

In an embodiment, the amount of the coniferous resins acid(s) is 1%-40%, more preferably 3%-20%, most preferably 5%-15%.

In an embodiment, the polymer film is a multilayer film, comprising one or more additional layer(s) arranged on one side or both sides of the active layer. Thus, the active layer may constitute at least one skin of the polymer film, or it may be arranged inside the film.

According to an aspect, the polymer film is an agricultural film, comprising the polymer film described in this description. In an embodiment, the agricultural film is a silage protecting sheath. In another embodiment, the agricultural film is a horticulture film.

In an embodiment, the polymer film is used for covering silage.

In an embodiment, the polymer film is arranged such that the active layer is against the silage to be covered.

In an embodiment, the polymer film is arranged to encapsulate the silage to be covered by the polymer film.

In an embodiment, the polymer film is a cover of stack or a rick.

In an embodiment, the polymer film is a bale wrapping foil.

In an embodiment, the polymer film is used for covering growing plant(s).

In an embodiment, the polymer film is arranged such that the active layer is arranged against the growing plant to be covered.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The description is only intended to illustrate the idea of the invention. The invention may vary in detail within the scope of the inventive idea defined in the following claims.

The invention claimed is:

1. An agricultural film comprising at least one active layer made of a composition containing:
   (a) a polymeric substrate comprising polyolefin polymer,
   (b) at least one coniferous resin acid dispersed in the polymeric substrate, and
   (c) one or more further polymer(s) for controlling the release rate of at least one coniferous resin acid(s), the one or more further polymer(s) selected from:
   (i) polyamide,
   (ii) inherently dissipative polymer (IDP),
   (iii) polyethylene-block-amide (PEBA), and
   (iv) polyether-polyamide block copolymer, wherein
   the amount of the one or more further polymer is 1%-90%, by mass, based on the mass of the at least one active layer, for covering silage.

2. The agricultural film as claimed in claim 1, comprising arranging an active layer against the silage to be covered.

3. The agricultural film as claimed in claim 1, comprising encapsulating the silage to be covered.

4. The agricultural film as claimed in claim 1 for covering a stack or a rick.

5. An agricultural film comprising
   at least one active layer made of a composition containing:
   (a) a polymeric substrate comprising polyolefin polymer,
   (b) at least one coniferous resin acid(s) dispersed in the polymeric substrate, and
   (c) one or more further polymer(s) for controlling the release rate of the coniferous resin acid(s), the one or more further polymer(s) selected from:
   (i) polyamide,
   (ii) inherently dissipative polymer (IDP),
   (iii) polyethylene-block-amide (PEBA), or
   (iv) polyether-polyamide block copolymer, wherein
   the amount of the one or more further polymer is 1%-90%, by mass, based on the mass of the at least one active layer, for covering growing plant(s).

6. The agricultural film as claimed in claim 5, comprising arranging an active layer against the growing plant to be covered.

7. The agricultural film of claim 1 wherein the polyamide is polyamide 6.

8. The agricultural film of claim 1 wherein the inherently dissipative polymer is polyethylene polyether copolymer.

9. The agricultural film of claim 1 wherein the amount of the one or more further polymer is 5%- 40%, by mass, based on the mass of the at least one active layer.

10. The agricultural film of claim 1 wherein the amount of the one or more further polymer is 10%- 30%, by mass, based on the mass of the at least one active layer.

11. The agricultural film of claim 5 wherein the polyamide is polyamide 6.

12. The agricultural film of claim 5 wherein the inherently dissipative polymer is polyethylene polyether copolymer.

13. The agricultural film of claim 5 wherein the amount of the one or more further polymer is 5%- 40%, by mass, based on the mass of the at least one active layer.

14. The agricultural film of claim 5 wherein the amount of the one or more further polymer is 10%-30%, by mass, based on the mass of the at least one active layer.

* * * * *